United States Patent
Kidston et al.

(10) Patent No.: US 9,299,093 B2
(45) Date of Patent: Mar. 29, 2016

(54) METHOD FOR CHARGING A PLUG-IN ELECTRIC VEHICLE

(75) Inventors: Kevin S. Kidston, New Hudson, MI (US); Emily R. Wu, Royal Oak, MI (US); Reena L. Datta, Rochester Hills, MI (US); Carol L. Johnson, Rochester Hills, MI (US); Richard A. Marsh, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1020 days.

(21) Appl. No.: 12/696,373

(22) Filed: Jan. 29, 2010

(65) Prior Publication Data

US 2011/0191220 A1    Aug. 4, 2011

(51) Int. Cl.
*G07F 19/00*    (2006.01)
*H02J 7/00*     (2006.01)
*G06Q 30/04*    (2012.01)
*G06Q 50/06*    (2012.01)

(52) U.S. Cl.
CPC .............. *G06Q 30/04* (2013.01); *G06Q 50/06* (2013.01)

(58) Field of Classification Search
USPC ........................................................ 705/34
See application file for complete search history.

(56) References Cited

U.S. PATENT DOCUMENTS

| | | | | |
|---|---|---|---|---|
| 7,013,205 | B1 * | 3/2006 | Hafner | B60L 11/126 180/165 |
| 7,755,329 | B2 * | 7/2010 | Kohn | H02J 7/0091 320/150 |
| 2007/0213921 | A1 * | 9/2007 | Yamaguchi | B60W 10/06 701/115 |
| 2008/0007202 | A1 * | 1/2008 | Pryor | B60L 11/1816 320/104 |
| 2008/0039989 | A1 * | 2/2008 | Pollack | B60L 11/1811 701/22 |
| 2008/0136371 | A1 * | 6/2008 | Sutardja | B60L 11/1816 320/109 |
| 2008/0203973 | A1 * | 8/2008 | Gale | B60L 11/1816 320/157 |
| 2009/0030712 | A1 * | 1/2009 | Bogolea | B60L 11/1816 705/1.1 |
| 2009/0062967 | A1 * | 3/2009 | Kressner | B60L 11/14 700/286 |
| 2009/0066287 | A1 * | 3/2009 | Pollack | G06Q 50/00 320/101 |
| 2009/0114463 | A1 * | 5/2009 | DeVault | B60K 6/365 180/65.29 |
| 2009/0140698 | A1 * | 6/2009 | Eberhard | H02J 7/045 320/152 |

(Continued)

FOREIGN PATENT DOCUMENTS

| | | |
|---|---|---|
| DE | 19930323 A1 | 1/2001 |
| EP | 1067649 A2 | 1/2001 |

(Continued)

OTHER PUBLICATIONS

German Office Action dated Feb. 20, 2014, 7 pages.

(Continued)

*Primary Examiner* — Ashford S Hayles
(74) *Attorney, Agent, or Firm* — Reising Ethington, P.C.; Lionel D. Anderson

(57) ABSTRACT

A method for charging a plug-in electric vehicle with an external power source. In an exemplary embodiment, the method receives one or more utility rate preferences from a user, determines the utility rates of a local utility company, determines the total charging time needed to charge the plug-in electric vehicle, uses the utility rate preferences, the utility rates and the total charging time to develop several charging options that are presented to a user, and charges the plug-in electric vehicle according to the charging option selection made by the user.

8 Claims, 3 Drawing Sheets

(56) References Cited

U.S. PATENT DOCUMENTS

| | | | |
|---|---|---|---|
| 2009/0216688 A1* | 8/2009 | Kelty | B60L 3/0092 705/418 |
| 2009/0229900 A1* | 9/2009 | Hafner | B60L 3/0046 180/65.275 |
| 2009/0313032 A1* | 12/2009 | Hafner | G06Q 30/02 705/1.1 |
| 2009/0313034 A1* | 12/2009 | Ferro | B60L 8/003 705/1.1 |
| 2009/0313098 A1* | 12/2009 | Hafner | B60L 8/003 705/14.1 |
| 2009/0313103 A1* | 12/2009 | Ambrosio | B60L 8/00 705/14.25 |
| 2010/0017249 A1* | 1/2010 | Fincham | B60L 3/12 705/412 |
| 2010/0045232 A1* | 2/2010 | Chen | B60L 3/0069 320/109 |
| 2010/0049533 A1* | 2/2010 | Ferro | G06Q 10/087 705/1.1 |
| 2010/0049737 A1* | 2/2010 | Ambrosio | B60L 11/1824 705/412 |
| 2010/0063645 A1* | 3/2010 | Brown | G06Q 10/04 700/296 |
| 2010/0094737 A1* | 4/2010 | Lambird | G06Q 30/04 705/34 |
| 2010/0169008 A1* | 7/2010 | Niwa | B60L 3/12 701/532 |
| 2010/0174667 A1* | 7/2010 | Vitale | B60L 3/0069 705/412 |
| 2010/0188043 A1* | 7/2010 | Kelty | B60L 3/0046 320/109 |
| 2010/0228415 A1* | 9/2010 | Paul | B60L 8/003 701/22 |
| 2010/0253290 A1* | 10/2010 | Hammerstrom | B60L 11/1824 320/137 |
| 2010/0256846 A1* | 10/2010 | Shaffer | B60L 11/184 701/22 |
| 2010/0306033 A1* | 12/2010 | Oved | G06Q 10/06375 705/7.37 |
| 2011/0016063 A1* | 1/2011 | Pollack | B60L 11/1824 705/412 |
| 2011/0047102 A1* | 2/2011 | Grider | B60L 8/003 705/412 |
| 2011/0050167 A1* | 3/2011 | Kissel, Jr. | B60L 3/0046 320/109 |
| 2011/0121791 A1* | 5/2011 | Basham | H02J 3/14 320/162 |
| 2011/0133655 A1* | 6/2011 | Recker | H02J 9/02 315/159 |
| 2011/0153474 A1* | 6/2011 | Tormey | G06Q 20/40 705/31 |
| 2011/0175569 A1* | 7/2011 | Austin | B60L 11/1824 320/109 |
| 2011/0204720 A1* | 8/2011 | Ruiz | B60L 11/1816 307/66 |
| 2011/0258112 A1* | 10/2011 | Eder | B60L 11/1809 705/39 |
| 2012/0191524 A1* | 7/2012 | Ambrosio | B60L 8/00 705/14.23 |
| 2012/0221160 A1* | 8/2012 | Hafner | B60L 8/003 700/295 |
| 2013/0265007 A1* | 10/2013 | Leary | B60L 11/1824 320/109 |

FOREIGN PATENT DOCUMENTS

| | | | |
|---|---|---|---|
| EP | 1067649 | A3 | 9/2004 |
| EP | 1067649 | B1 | 6/2010 |

OTHER PUBLICATIONS

Clement; K., Haesen; E., and Driesen; J., Coordinated Charging of Multiple Plug-In Hybrid Electric Vehicles in Residential Distribution Grids, Power Systems Conference and Exposition, Mar. 2009, 7 pages.

* cited by examiner

METHOD FOR CHARGING A PLUG-IN ELECTRIC VEHICLE

TECHNICAL FIELD

The present invention generally relates to a method for charging a plug-in electric vehicle and, more particularly, to a method for charging a plug-in electric vehicle with an external power source.

BACKGROUND

When evaluating a vehicle for purchase, the cost of operation may be an important factor. For instance, most vehicles have a fuel consumption rating (e.g., a miles-per-gallon (MPG) rating), and users sometimes consider this rating when making a vehicle purchase. Similarly, for a plug-in electric vehicle, which may include plug-in hybrid electric vehicles (PHEVs), battery electric vehicles (BEVs), extended range electric vehicles (EREVs), etc., the cost of charging the vehicle may be an important element in the cost of operation.

SUMMARY

According to one embodiment, there is provided a method for charging a plug-in electric vehicle with an external power source, comprising the steps of (a) receiving a utility rate preference; (b) determining utility rates; and (c) charging the plug-in electric vehicle at a time when the utility rates satisfy the utility rate preference.

According to another embodiment, there is provided a method for charging a plug-in electric vehicle with an external power source, comprising the steps of: (a) determining utility rates; (b) determining a total charging time needed to charge the plug-in electric vehicle, wherein the utility rates and the total charging time are used to develop one or more charging options that are presented to a user for selection; and (c) charging the plug-in electric vehicle according to the charging option selected by the user.

According to another embodiment, there is provided a method for charging a plug-in electric vehicle with an external power source, comprising the steps of: (a) receiving a utility rate preference from a user, the utility rate preference pertains to the utility rate that a vehicle user is willing to pay to charge the plug-in electric vehicle; (b) determining utility rates from utility rate information that is wirelessly received at the plug-in electric vehicle; (c) determining a total charging time needed to charge the plug-in electric vehicle; (d) using the utility rate preference, the utility rates, and the total charging time to develop several charging options, wherein each charging option is presented to the user; (e) receiving a charging option selection from the user; and (f) charging the plug-in electric vehicle according to the charging option selection.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
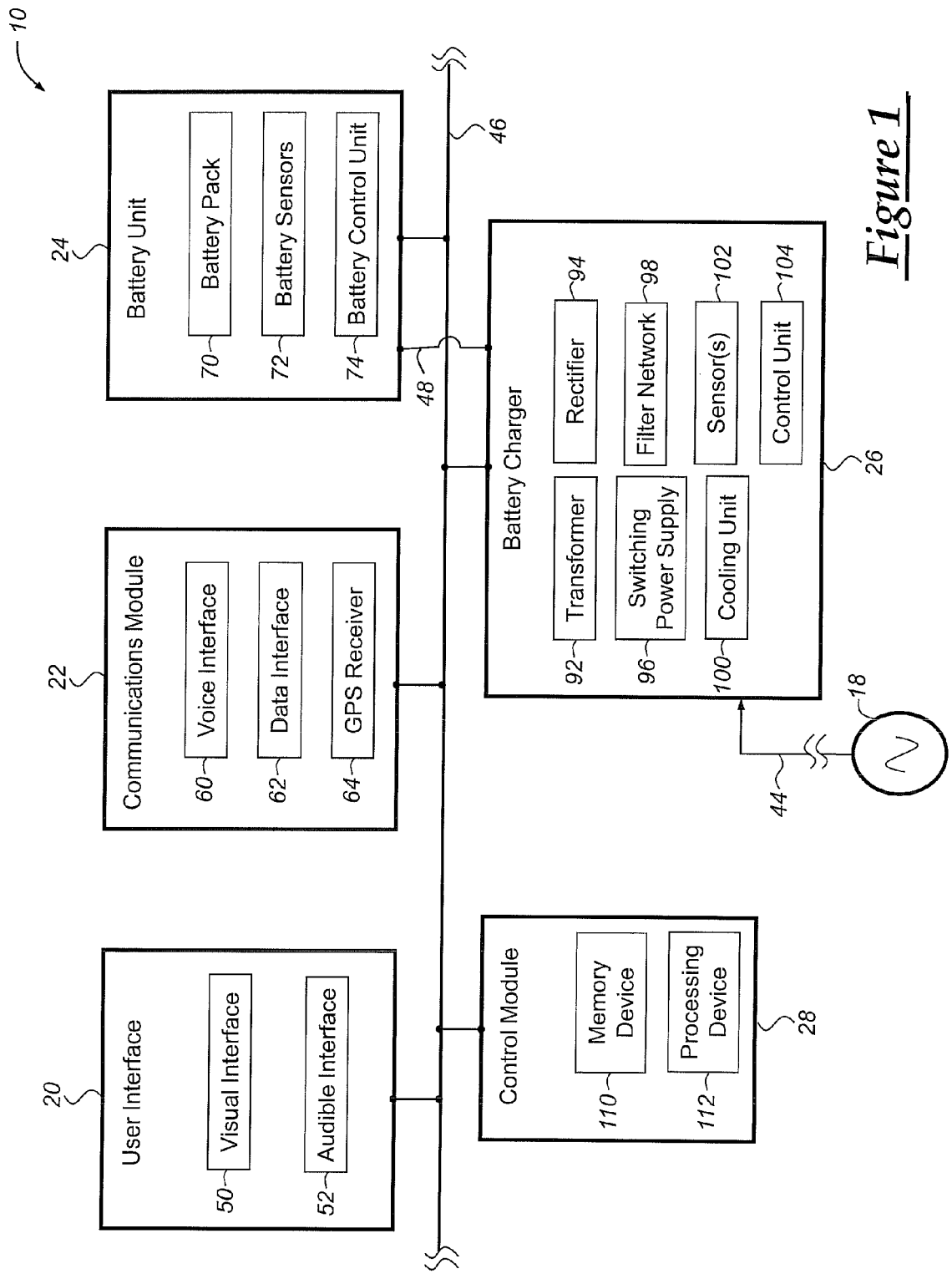
FIG. 1 is a schematic block diagram of an exemplary vehicle charging system.

The exemplary method described below receives one or more utility rate preferences from a user, determines local utility rates, executes a charging algorithm that takes into account both the utility rate preferences and the local utility rates, and charges the plug-in electric vehicle according to the output of the charging algorithm. It is also possible for the exemplary method to present the user with several charging options before actually charging the plug-in electric vehicle, so that they may choose from among the charging options and dictate the manner in which the vehicle is charged. It should be appreciated that the present method may be used with any type of plug-in electric vehicle including, but certainly not limited to: plug-in hybrid electric vehicles (PHEVs), extended range electric vehicles (EREV), battery electrical vehicles (BEVs), or any other vehicle where a battery is charged with an external power source. Furthermore, the method described herein is not limited to the particular vehicle charging system shown in FIG. 1, and may be used with any number of different vehicle systems. According to an exemplary embodiment, vehicle charging system 10 may be used to charge a plug-in electric vehicle with an external power source 18 and includes a user interface 20, a communications module 22, a battery unit 24, a battery charger 26, and a control module 28.

User interface 20 may include any combination of hardware, software and/or other components that are located within the plug-in electric vehicle and enable a vehicle user to exchange information or data with the vehicle. This includes, for example, input components like a touch-screen display, a microphone, a keyboard, a pushbutton or other control where user interface 20 receives information from a vehicle user, as well as output components like a visual display, an instrument panel, or an audio system where user interface 20 provides information to the vehicle user. In some cases, user interface 20 includes components with both input and output capabilities, such as the exemplary visual interface 50 and audible interface 52 shown in FIG. 1. Visual interface 50 may include any suitable interface that is located within the vehicle and visually presents information to and/or receives information from a vehicle user, and it may be driven by a sequence of navigable menus that enable the user to exchange information with vehicle charging system 10. A visual touch-screen display is one example of a suitable visual interface. Likewise, audible interface 52 may include any suitable interface that is located within the vehicle and audibly presents information to and/or receives information from a user, and it may be part of an on-board automated voice processing system that uses voice-recognition and/or other human-machine interface (HMI) technology. User interface 20 may be a stand-alone module; it may be part of an infotainment system or part of some other module, device or system in the vehicle; it may be mounted on a dashboard (e.g., with a driver information center (DIC)); it may be projected onto a windshield (e.g., with a heads-up display); it may be integrated within an existing audio system; or it may simply include an electronic connection or port for connecting with a laptop or other computing device, to cite a few examples.

As explained below in more detail, user interface 20 may be used by the present method to exchange information between a vehicle user and the plug-in electric vehicle in a way that facilitates the charging process. For instance, user interface 20 may receive one or more utility rate preferences, vehicle conditions, and/or other input from a vehicle user; input that may be used by the present method to charge the plug-in electric vehicle. In addition, user interface 20 may be used by the present method to provide charging status, reports and/or other output to a vehicle user. Other user interfaces may be used instead, as the exemplary user interfaces shown and described herein represent only some of the possibilities. The present method may utilize any user interface to exchange information between a vehicle user and the plug-in electric vehicle and is not limited to any particular type.

Communications module 22 may include any combination of hardware, software and/or other components that are located within the plug-in electric vehicle and enable wireless voice and/or data communication with the vehicle. According to one exemplary embodiment, communications module 22 includes a voice interface 60, a data interface 62 and a GPS receiver 64, and may be bundled or integrated within a device such as a telematics unit. Voice interface 60 enables voice communication to and/or from the plug-in electric vehicle and may include a cellular chipset (e.g., CDMA or GSM chipset), a vocoder, voice over IP (VOIP) equipment, and/or any other suitable device. Data interface 62, on the other hand, enables data communication to and/or from the plug-in electric vehicle and may include a modem (e.g., a modem using EVDO, CDMA, GPRS or EDGE technologies), a wireless networking component (e.g., one using an IEEE 802.11 protocol, WiMAX, BlueTooth, etc.), or any other suitable device. Depending on the particular embodiment, communications module 22 may communicate over a wireless carrier system (e.g., a cellular network), a wireless network (e.g., a wireless LAN, WAN, etc.), or some other wireless medium. For combined services that involve both voice and data communications, communications module 22 may utilize a single call over a voice channel and switch, as needed, between voice and data transmissions; this can be done using techniques known to those skilled in the art. The equivalent can also be done over a data channel. GPS receiver 64 may receive signals from a constellation of GPS satellites and uses these signals to determine vehicle position, as is well understood in the art.

The present method may use communications module 22 to exchange information between a vehicle user, a local utility, or some other remotely-located entity and the plug-in electric vehicle in a way that facilitates the charging process. For example, communications module 22 may be used to receive utility rates from a local utility, to receive utility rate preferences, vehicle conditions and/or other information from a remotely-located vehicle user, etc. This includes remote vehicle users who enter such information via a website or mobile device and then send it to the plug-in electric vehicle. In one embodiment, communications module 22 acts as an alternative to user interface 20 for exchanging information between a vehicle user and the plug-in electric vehicle; in another embodiment, communications module 22 and user interface 20 are both used to exchange such information; and in yet another embodiment, only user interface 20 is used to exchange such information. Other embodiments and arrangements are also possible. The method described below is not limited to any particular communications module or technology, and it may be used with devices other than the exemplary communications module shown and described here.

Battery unit 24 provides the plug-in electric vehicle with electrical power and, depending on the particular embodiment, may be the primary electrical power source for the vehicle or may be used in conjunction with another power source for power supplementation purposes, to cite two examples. Many different battery types and arrangements may be used, including the exemplary one schematically shown here which includes a battery pack 70, one or more battery sensors 72, and a battery control unit 74. Battery pack 70 may include a collection of identical or individual battery cells connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include all types of lithium-ion (e.g., lithium iron phosphate, lithium nickel manganese cobalt, lithium iron sulfide, lithium polymer, etc.), lead-acid, advanced lead-acid, nickel metal hydride (NiMH), nickel cadmium (NiCd), zinc bromide, sodium nickel chloride (NaNiCl), zinc air, vanadium redox, and others. The battery pack 70 may provide approximately 40-600V, depending on its particular design and application. For example, a heavy truck using a two-mode hybrid system may require a high voltage battery pack capable of providing about 350V, where a lighter vehicle may only need about 200V. In another embodiment, the battery charging system 10 may be part of a belt-alternator-starter (BAS) or BAS-plus type system and thus only require a battery pack that provides about 40-110V. In any case, battery pack 70 should be designed to withstand repeated charge and discharge cycles and to receive electrical energy from external power source 18. Skilled artisans will appreciate that the system and method shown and described herein are not limited to any one particular type of battery or battery arrangement, as a number of different battery types could be employed.

Battery sensors 72 may include any combination of hardware and/or software components capable of monitoring battery conditions such as battery temperature, battery voltage, battery current, battery state of charge (SOC), battery state of health (SOH), etc. These sensors may be integrated within high voltage battery unit 24 (e.g., an intelligent or smart battery), they may be external sensors located outside of the battery unit, or they may be provided according to some other known arrangement. Battery sensors 72 may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from battery sensors 72 may be provided to battery control unit 74, battery charger 26, control module 28, or some other appropriate device.

Battery control unit 74 may include any variety of electronic processing devices, memory devices, input/output (I/O) devices, and other known components, and may perform various control and/or communication related functions. For example, battery control unit 74 may receive sensor signals from the various battery sensors 72, package the sensor signals into an appropriate sensor message, and send the sensor message to control module 28 over a communication bus 46 or the like. It is possible for battery control unit 74 to gather battery sensor readings and store them in local memory so that a comprehensive sensor message can be provided to control module 28 at a later time, or the sensor readings can be forwarded to module 28 or some other destination as soon as they arrive at battery control unit 74, to cite a few possibilities. Instead of sending the battery sensor readings to control module 28 for subsequent processing, it is possible for battery control unit 74 to process or analyze the sensor readings itself.

In another capacity, battery control unit 74 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Battery charger 26 is connected to external power source 18 and high voltage bus or circuit 48 so that it may provide electrical power to battery unit 24. According to an exemplary embodiment, battery charger 26 is a programmable charger that is mounted in the plug-in electric vehicle and provides electrical power to battery unit 24 according to charging control signals received from control module 28. Battery charger 26 may be entirely located inside of the plug-in electric vehicle (i.e., an internal charger), partially located inside and partially located outside of the vehicle, or it may be entirely located outside of the vehicle (i.e., an external charger), to cite a few possibilities. The exact arrangement and construction of battery charger 26 is not important, as any type of suitable battery charger may be used. The battery charger may include a transformer 92, a rectifier 94, a switching power supply 96, a filter network 98, a cooling unit 100, one or more sensors 102, a control unit 104, and any other suitable components known in the art.

Depending on the particular arrangement, transformer 92 steps-up and/or steps-down the input voltage from external power source 18 to a different and, in some cases, programmable output voltage. Rectifier 94 rectifies the AC signal into a DC signal and may include a half-wave, full-wave or other type of known rectifying arrangement. Switching power supply 96 takes the rectified signal and, according to one embodiment, rapidly switches a power transistor or other switch between saturation ('on') and cutoff ('off') according to a variable duty cycle whose average corresponds to the desired output voltage. In this way, switching power supply 96 may control the amount of current, and hence the output power, that is provided by battery charger 26 to high voltage circuit 48. Filter network 98, which is optional, may include any combination of electrical components that can be used to filter, process, or otherwise condition the output voltage before providing it to high voltage circuit 48. Cooling unit 100, also an optional component, may use any combination of fans, water jackets, heat sinks, or other suitable cooling means to reduce the temperature of battery charger 26 during charging. Although not shown here, battery charger 26 could have multiple power outputs including a high voltage output connected to high voltage circuit 48 and a lower voltage output connected to a low voltage circuit (not shown).

Battery charger sensors 102 may include any combination of hardware and/or software components capable of monitoring battery charger conditions such as charger temperature, charger input voltage (typically an AC voltage), charger output voltage (typically a DC Voltage), charger current, etc. Depending on the particular embodiment, these sensors may be integrated within battery charger 26, they may be external sensors located outside of the battery charger, or they may be provided according to some other known arrangement. A charger temperature sensor may sense the temperature of one or more components within battery charger 26, including the temperature of the least efficient component; that is, the component of the battery charger that exhibits the most heat. Battery charger sensors 102 may be coupled directly to control unit 104, or they could be coupled to any number of other devices, components, modules, etc., including some located outside of battery charger 26, like control module 28.

Control unit 104 may include any variety of electronic processing devices, memory devices, input/output (I/O) devices, and other known components, and may perform various control and/or communication related functions. For example, control unit 104 could receive sensor signals from the various battery charger sensors 102, package the sensor signals into an appropriate sensor message, and send the sensor message to control module 28 over communication bus 46, which may be a CAN bus, a system management bus (SMBus), a proprietary communication link, or any other communication means known to those skilled in the art. In another capacity, control unit 104 may receive charging control signals or other instructions from control module 28 or some other device, interpret the instructions, and execute the instructions by correspondingly controlling devices within battery charger 26. For instance, if control module 28 sends a charging control signal to battery charger 26, then control unit 104 can use the charging control signal to manipulate the pulse width modulated (PWM) duty-cycle of switching power supply 96. This, in turn, causes switching power supply 96 to alter the amount of current, and ultimately the amount of output power, that is provided by battery charger 26 to battery unit 24. These are, of course, only some of the possible arrangements and functions of control unit 104, as others are certainly possible.

Control module 28 may include any combination of electronic processing devices, memory devices, input/output (I/O) devices, and/or other known components, and may perform various control and/or communication related functions. In an exemplary embodiment, control module 28 includes an electronic memory device 110 and an electronic processing device 112. Memory device 110 may include any type of suitable electronic memory means and may store a variety of data and information. This includes, for example, utility rates and utility rate preferences (e.g., those provided by a user), sensed vehicle conditions (e.g., those provided by sensors 72 and 102), look-up tables and other data structures, algorithms, etc. (e.g., the charging algorithm described below), vehicle component characteristics and background information (e.g., temperature limits, temperature profiles or operational settings for various devices within the charging system), etc. The present method—as well as any other electronic instructions, algorithms and/or information needed for such tasks—may be stored or otherwise maintained in memory device 110. Processing device 112 may include any type of suitable electronic processor (e.g., a microprocessor, a microcontroller, an application specific integrated circuit (ASIC), etc.) that executes instructions for software, firmware, programs, algorithms, scripts, etc. The exemplary processor 112 is not limited to any one type of component or device. Control module 28 may be electronically connected to other vehicle devices and modules via a suitable connection like communications bus 46 and can interact with them as required. These are, of course, only some of the possible arrangements, functions and capabilities of control module 28, as others are certainly possible.

Depending on the particular embodiment, control module 28 may be a stand-alone vehicle electronic module (e.g., a vehicle control integrated module (VCIM), a traction power inverter module (TPIM), a battery power inverter module (BPIM), etc.), it may be incorporated or included within another vehicle electronic module (e.g., a power train control module or a hybrid control module), or it may be part of a larger network or system (e.g., a battery management system (BMS), a vehicle energy management system, etc.), to name a few possibilities. Many different types and arrangements for control module 28 may be used with the method described below, as the present method is not limited to any one embodiment.

External power source 18 provides battery charging system 10 with electrical power over a power coupling 44, and may be one of a number of different power supply types known in the art. For example, external power source 18 can be a standard AC power outlet that provides 110VAC or 220VAC of electricity at 50 Hz or 60 Hz, or it can be a portable generator such as the type that runs on natural gas, propane, gasoline, diesel, or the like. In one embodiment, external power source 18 is a renewable power source, such as a remote charging station powered by energy from solar panels, wind turbines, hydroelectric means, biomass, etc. External power source 18 may be connected to battery charger 26 in one of a variety of different ways, including via conductive connections, inductive connections, as well as other connections known in the art. In an exemplary embodiment, power coupling 44 is a specialized vehicle power coupling (such as those described in specifications SAE J-1772 and J-1773), and includes a first end for plugging into a standard AC wall outlet and a second end for plugging into the plug-in electric vehicle. This enables a user to easily plug and unplug the vehicle from a common AC wall outlet, such as those found in most garages. Skilled artisans will appreciate that the system and method described herein are not limited to any particular external power source, as a number of different power source types could be used.

Figure 2:
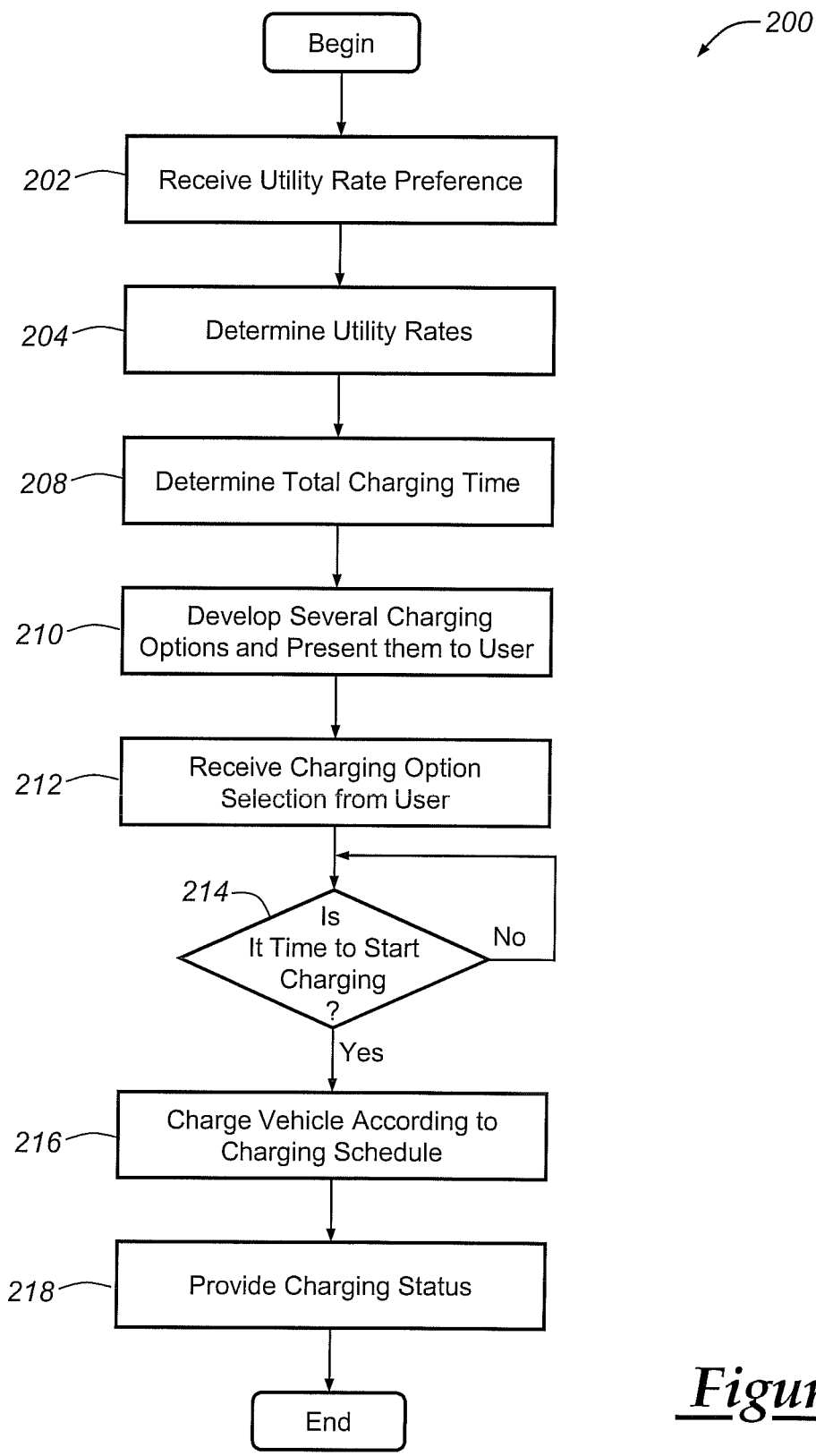
FIG. 2 is a flowchart of an exemplary method that may be used to charge a plug-in electric vehicle and may be used with the exemplary vehicle charging system shown in FIG. 1.

Turning now to FIG. 2, there is shown an exemplary method 200 for charging a plug-in electric vehicle with an external power source. In one embodiment, method 200 receives one or more utility rate preferences from a user, determines utility rates from a local utility company, executes a charging algorithm that takes into account both the utility rate preferences and the local utility rates, and then charges the plug-in electric vehicle according to the results of the charging algorithm. It is also possible for method 200 to present the user with several charging options before actually charging the plug-in electric vehicle, so that they may choose from among the charging options and somewhat control the manner in which the vehicle is charged. Accordingly, method 200 may be used to charge a plug-in electric vehicle in a cost-effective manner that lowers the cost of operation for the vehicle by developing a charging strategy that is cognizant of the current utility rates. Although the following description is provided in the context of a plug-in hybrid electric vehicle (PHEV), it should be appreciated that the present method may be used with any type of plug-in electric vehicle including, but certainly not limited to, plug-in hybrid electric vehicles (PHEVs), battery electric vehicles (BEVs), extended range electric vehicles (EREVs), as well as any other plug-in electric vehicle that is charged with an external power source.

Beginning with step 202, the method receives a utility rate preference. A "utility rate preference" includes any choice, amount, limit, threshold and/or other information that pertains to the utility rate that a vehicle user is willing to pay to charge their plug-in electric vehicle (e.g., a maximum electric utility rate of $/KWH). As will be subsequently explained, the present method takes these utility rate preferences into account when determining a charging strategy for when and how long to the charge the plug-in electric vehicle. The utility rate preference may be a single, constant value or it may include a number of different values. For instance, a vehicle user may provide a single utility rate preference to be used all the time, no matter when and where the vehicle is being charged. Or a vehicle user may provide multiple utility rate preferences for different seasons (e.g., a higher rate preference for the summer because utility rates are typically higher in the summer than in the winter), for different months, weeks and/or days (e.g., a lower rate preference for the weekend when the vehicle user is willing to wait for better rates), for different locations (e.g., a first rate preference for a first location in the city and a second rate preference for a second location in the country), etc. In addition, the utility rate preference does not necessarily need to be a single absolute quantitative value (e.g., a maximum utility rate of $0.10/KWH). Instead, the utility rate preference may be provided as a range of values (e.g., maximum utility rate of $0.08-$0.12/KWH, depending on one or more factors), as a relative value (e.g., 1/5, 2/5, ... 5/5, where 1/5 is the lowest rate preference and 5/5 is the highest), as a qualitative value (e.g., low, medium and high rate preferences), as a time (e.g., begin charging after 12:00 AM, when utility rates are lower), or in any other suitable format. The preceding examples are only meant to illustrate some of the possibilities, as any utility rate preference (no matter how it is expressed or provided) may be received in step 202.

Utility rate preferences may be received in step 202 according to a variety of different methods and techniques. For instance, a vehicle user may provide utility rate preferences via an in-vehicle user interface 20, via wireless communication through communications module 22, or using any other suitable method. According to the in-vehicle user interface example, a vehicle user can enter one or more utility rate preferences by navigating visual and/or audible menus of user interface 20 and providing the desired rate preferences when asked. In a first wireless communication example, a vehicle user can provide the utility rate preferences using an application or other program installed on their mobile phone, PDA, computer, etc., where the application formats the utility rate preferences provided by the user and wirelessly delivers them to the vehicle. This wireless communication can then be received and processed by communications module 22 at the plug-in electric vehicle. In a second wireless communication example, a vehicle user provides utility rate preferences to an affiliated website (e.g., www.onstar.com), which then formats and wirelessly transmits the information to the vehicle via communications module 22. The utility rate preference information in these examples may be provided to the vehicle directly, indirectly through a call center or other back-end facility, or to some other suitable destination. Any technique for providing user rate preferences to the plug-in electric vehicle may be used.

These and other preferences may be stored in memory device 110 or elsewhere so that the vehicle user does not have to constantly provide them to charging system 10, or they can be entered each time anew. Of course, these are only some of the examples of preferences that may be received in step 202, as others are also possible. For instance, the vehicle may come equipped with default utility rate preferences from the factory or dealer. In such a case, it may not be necessary for the user to actually provide such rate preferences, as they may be automatically obtained or retrieved from some other module in the vehicle or elsewhere. Other embodiments are certainly possible.

In step 204, the method determines utility rates. Utility rates are typically set by an electrical utility company and/or the government and are usually expressed in terms of $/KWH, although they do not need to be. Utility rates can be determined by the present method in a variety of ways. In a first embodiment, a vehicle user manually enters the utility rates (e.g., manually entering the information from a rate schedule provided by the utility company). Any of the methods—including the different "in-vehicle" and "wireless" techniques described in step 202—may be used for this purpose. In another embodiment, the utilities rates are automatically sent to the plug-in electric vehicle without the need of the vehicle user. For example, the plug-in electric vehicle and/or a call center affiliated with the vehicle may query the utility company for their latest rate schedule. Utility rate information could then be wirelessly sent to communications module 22 directly from the utility company, or it could be sent via a call center or other back-end facility. In any case, the utility rates may be provided on an hourly basis (e.g., 11 AM-7 PM, 7 PM-11 AM), a daily basis (e.g., Monday-Friday, Saturday-Sunday), a weekly basis, a monthly basis, a season basis (e.g., June-October, November-May, etc.), a yearly basis, or otherwise. These non-limiting examples are only some of the potential ways in which utility rates may be expressed and/or gathered by the present method; any other suitable method may be used instead. In addition, steps 202 and 204 may be performed in any order, as step 204 may be performed before step 202 so that the user can select from the various utility rates, for example. Those skilled in the art will appreciate that the present method is particularly useful in instances where the utility company offers a variable rate service, although this is not necessary.

Step 208 determines the total charging time that is needed to charge the plug-in electric vehicle. By knowing the total amount of charging time that is needed, method 200 may construct or develop suitable charging strategies. For example, different charging strategies may be needed if the plug-in electric vehicle requires 30 minutes of charging time versus 3 hours of charging time. Any number of different techniques and methods may be used by step 208 to determine the total charging time, as this step is not limited to any particular one. According to an exemplary embodiment, the total charging time that is needed to charge battery pack 70 takes into account current charging conditions (current charging conditions may include the power available from external power source 18, the condition of battery pack 70 (e.g., the state-of-charge (SOC) or voltage), the condition of charger 26 (e.g., the temperature of the charger, etc.), or any other condition or parameter that can affect charging). Put differently, in order to determine how much time is needed to charge battery pack 70, step 208 may need to know: how much power is available for charging, how much energy is required by the battery, and other charging conditions, as all of these factors can impact the charging time.

The following non-limiting examples illustrate some potential ways in which current charging conditions may be gathered. Power coupling 44, battery charger 26 and/or some other device may be used to detect a connection with external power source 18 and, if connected, determine the power available. If, for some reason, external power source 18 is providing less power than normal, then it may take longer to the charge battery pack 70; this may be factored into the total charging time calculation in step 208. Power couplings that conform to the SAE J-1772 and J-1773 standards are generally capable of providing this type of information, however, other techniques for determining available power from external power source 18 may also be used. Battery sensors 72 may determine the voltage or state-of-charge (SOC) for vehicle battery pack 70. The SOC of the battery pack will, of course, affect the amount of time needed for charging (battery pack 70 will take longer to charge if it has an SOC of 25% versus 75%, assuming all other charging conditions are the same). Step 208 may also take into account factors like battery pack temperature, battery pack state-of-health (SOH), battery pack voltage or current, battery charger temperature, limitations on the amount of power available from external power source 18, etc. Any method or technique for determining battery charging time may be used in step 208, as the preceding examples only address some of the possibilities.

Step 210, which is an optional step, develops several charging options and presents them to the vehicle user. The charging options may take into account the total amount of charging time that is needed, the utility rate preferences provided earlier by the vehicle user, the utility rates gathered from the utility company, the time when the vehicle user wishes to use the vehicle next, as well as any other pertinent factors. The different charging options will oftentimes balance the cost of charging with the convenience of charging the plug-in electric vehicle quickly (less expensive charging options may take longer because they are waiting for the least expensive time slots). For example, step 210 may generate three different charging options (each of these exemplary options assumes that eight hours of charging is needed, that the vehicle is plugged in at 6:00 PM, and that the user wishes to use the vehicle by 6:00 AM the next day). A first and least expensive charging option only charges the plug-in electric during the least expensive time slots, even if it results in the vehicle only being partially charged (e.g., the plug-in electric vehicle is charged between 12:00 AM-6:00 AM which has the least expensive utility rates, even though the vehicle is not fully charged). Such an option may be preferable if the vehicle user only intends on using the vehicle for short distances the next day. A second and more expensive charging option tries to charge the vehicle during the least expensive time slots, but if such time slots do not accommodate the energy needs of the vehicle, then it uses other time slots to make up the difference (e.g., the plug-in electric vehicle is charged between 6:00M-8:00M and 12:00 AM-6:00 AM, which results in a fully charged vehicle even though two hours of more expensive charging is used). The charging segments of the second charging option are discontinuous (i.e., there is a break between charging segments). A third and most expensive charging option charges the plug-in electric vehicle as quickly as possible, regardless of the utility rates (e.g., the plug-in electric vehicle is charged from 6:00M-2:00 AM). The third charging option is the fastest option since it puts more importance on vehicle readiness than charging utility rate. The first and third charging options each includes a single charging segment (12:00 AM-6:00 AM and 6:00M-2:00 AM, respectively), but the second charging option includes multiple charging segments (6:00 PM-8:00M and 12:00 AM-6:00 AM). It should be appreciated that a charging option may include any number of charging segments with different charging start and end times, and is not limited to the examples above.

In another embodiment, step 210 takes into account operational and/or environmental conditions like battery pack and/or battery charger temperatures. If, for example, it is preferable to limit charging to no more than four continuous hours, then the different charging options may divvy up the charging segments differently in order to accommodate this restriction. The different charging options described here may be generated without taking into account the utility rate preferences of the user, so that the user first influences the charging process at this point. Or, in a different embodiment, the different charging options are specifically developed in order to best address and satisfy the utility rate preferences previously provided. It is also possible for the vehicle user to provide a desired charging start time—in addition to a desired charging end time—which is the time when charging system 10 initializes the charging process. To illustrate, if the vehicle user supplies a desired start time of 8:00 PM, then the three exemplary charging options above may be changed to 12:00 AM-6:00 AM (first charging option), 8:00 PM-10:00 PM and 12:00 AM-6:00 AM (second charging option), and 8:00M-4:00 AM (third charging option). It is also possible for step 210 to provide an estimated cost for each charging option (e.g., a dollar amount based on the previously gathered utility rates). This would give the vehicle user the ability to weigh the cost of charging the plug-in electric vehicle against the convenience of having the vehicle charged and ready to go as quickly as possible. The different charging options may be generated and presented to the vehicle user in any number of different ways. This includes, for example, generating the charging options using look-up tables or the like (e.g., a time versus utility rate look-up table) and presenting the charging options via visual interface 50, audible interface 52 and/or wirelessly sending the charging options to a mobile device, computer, etc. via communications module 22. Skilled artisans should appreciate that other presentation options are possible.

Step 212 receives a charging option selection from the user. This step is not limited to any specific technique, as the user's selection may be provided via visual interface 50, audible interface 52 and/or wirelessly sending the selection from a mobile device, computer, etc. via communications module 22. Once the vehicle user makes a selection, the selected charging option is used to create a charging schedule for charging the plug-in electric vehicle. A charging schedule includes one or more charging segments each having a charging start time and a charging end time. Method 200 may also provide the user with the ability to override the charging options presented in step 210. For example, if the vehicle user is not satisfied with any of the presented options, then the user can manually enter different utility rate preferences, charging schedules, charging options, charging segments, charging start/end times, etc. If the utility rate preference entered in step 202 results in no viable charging options (e.g., the utility rate preference entered is lower than all available rates), for example, then the vehicle user can override the previous utility rate preference and instruct method 200 to charge the vehicle at a higher cost. As previously mentioned, presenting the vehicle user with charging options and waiting for their selection (steps 210, 212) is optional. It is also possible for step 210 to simply execute a charging algorithm based on the information entered in steps 202 and 204 and to generate a charging schedule from the output of the algorithm. Such a process would not require any charging option selection from the vehicle user. In either case, a charging schedule is generated where the charging schedule includes one or more charging segments each with its own charging start and end times.

Figure 3:
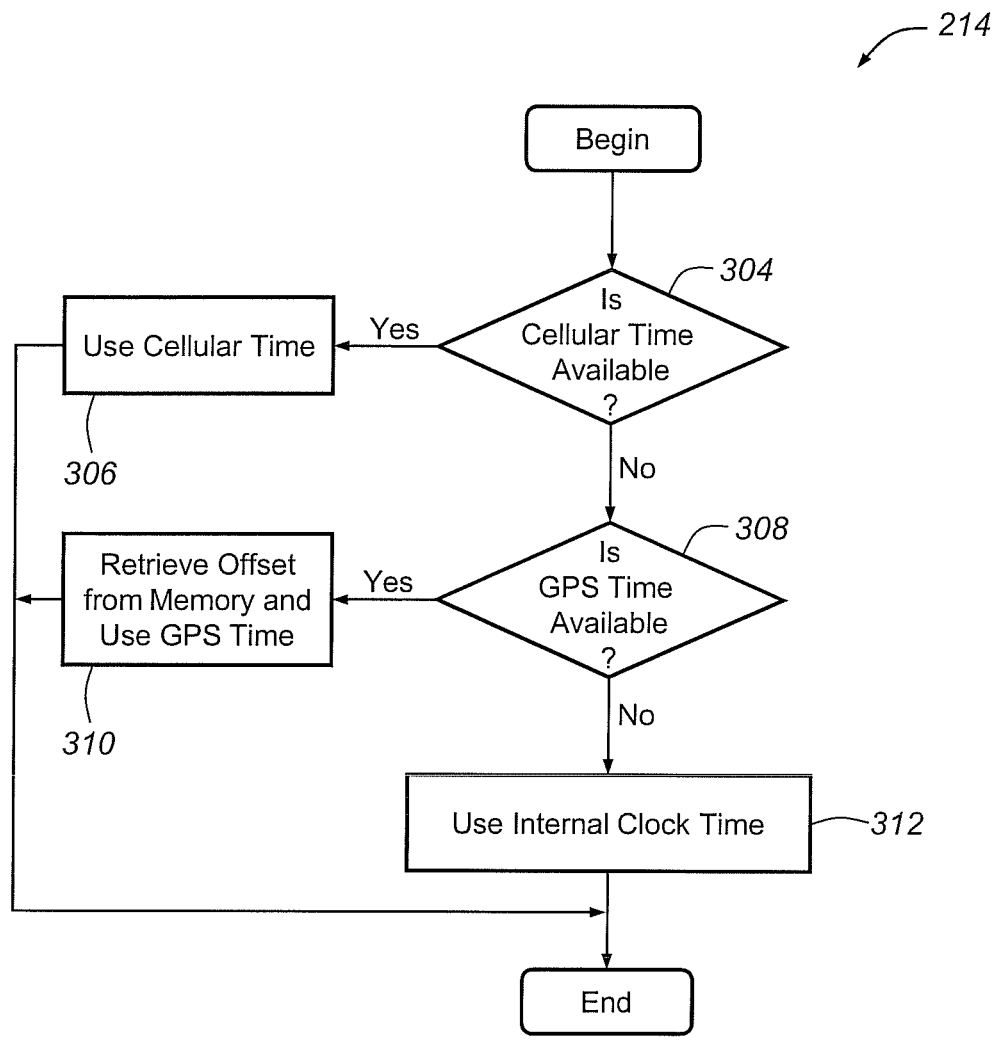
FIG. 3 is a flowchart of an exemplary method that may be used to determine time and may be used with the exemplary method in FIG. 2.

Step 214 determines if it is time to start charging the plug-in electric vehicle. In most instances, this means determining if the current time is equal to or greater than the charging start time for a charging segment of the charging schedule. It is usually helpful for method 200 to use an accurate means for keeping track of time, since charging the vehicle at the wrong time may result in higher utility rates. Although any technique or method for keeping track of time may be used, FIG. 3 illustrates an exemplary method that may be used at step 214. Generally speaking, the exemplary approach shown in FIG. 3 resorts to a prioritized list of potential time sources: cellular time followed by GPS time followed by internal clock time. This technique may be particularly helpful when the plug-in electric vehicle travels from one place to another, as the local time can be automatically updated by the vehicle without any intervention by the vehicle user.

Step 304 first checks to see if cellular time is available, as this is most preferable time source. "Cellular time" broadly includes any time reading that is determined from information or data that is wirelessly provided by a cellular or other wireless network. For example, many CDMA and GSM networks embed time-related information in the wireless signals that are exchanged between cellular towers and the mobile devices located within their area (this includes communications module 22). This time-related information may be extracted and processed by communications module 22 and converted into cellular time. If cellular time is available in a particular area, then step 306 uses the cellular time since it will typically provide an accurate local time that already takes into account local discrepancies such as daylight's savings, time zones, etc. However, if cellular time is not available, then the method proceeds to step 308 to check to see if GPS time is available.

"GPS time" broadly includes any time reading that is determined from information or data that is wirelessly provided by one or more GPS satellites and an offset value. GPS time may be particularly useful in areas lacking sufficient cellular signals such that cellular time is not available. Consider the example where a plug-in electric vehicle is located in a remote area that lacks decent cellular coverage, but is in view of three or more GPS satellites (three or more GPS satellites are needed to accurately determine the vehicle's position). In this case, the present method may be able to accurately determine the position of the vehicle and a standardized time (e.g., Greenwich Mean Time (GMT) or Julian Time), but it still will not know the local time considering that the GPS satellites do not maintain a registry of local times for every location on Earth. This is where a stored offset value may come into play. A stored offset value represents the difference or offset between the local time and some standardized time like GMT. In order to have a stored offset value, one must have been calculated at an earlier time when the vehicle concurrently gathered time readings from a reliable local time source and the GPS satellites. By knowing both the local time (say 2:00 PM) and the GPS time (say 9:00 PM) which is a standardized time like GMT, an offset value of seven hours can be determined Later on if only GPS time is available (and not the reliable local time source originally used to calculate the offset value), step 310 can use the stored offset value to determine the local time. However, if GPS time is not available, then the method proceeds to step 312 to check to see if internal clock time is available. The internal clock time may be time locally maintained by any device within the plug-in electric vehicle, such as one the electronic modules.

In one embodiment, the conversions, calculations, corrections, etc. that are mentioned above are performed by GPS receiver 64, communications module 22, control module 28 or some other suitable device. Step 214 compares the current time—as calculated by any suitable method—to the start times of the one or more charging segments to see if it is time to start charging the plug-in electric vehicle. This process continues until the current time equals or surpasses the start time, at which point the method proceeds to the next step.

Step 216 charges the plug-in electric vehicle according to the charging schedule previously determined Assuming that the plug-in electric vehicle is properly plugged into an external power source 18, this step will begin charging the vehicle at the charging start time, continue for the duration of the charging segment, and stop at the charging end time. If the charging schedule includes additional charging segments (e.g., 8:00 PM-10:00 PM and 12:00 AM-6:00 AM), then the charging process will continue at the next charging segment. This continues until all of the charging schedule has been completed. By automatically waking the plug-in electric vehicle up and charging it according to a charging schedule that is based on the utility rate preferences and utility rates, the present method is able to cost effectively charge the vehicle and have it ready for the user at a desired time.

Step 218 is an optional step that provides the vehicle user with a charging status. There are a number of ways to provide or convey a charging status to the vehicle user, including audio, visual, and/or other means. In one embodiment, a charging status consisting of a display statement (e.g., a statement indicating whether or not the charge is complete or incomplete, the percentage of SOC available, the battery voltage value measurement, and/or total cost of the charge), is provided via visual interface 50 and/or audible interface 52 after a key-on start. It is also possible to provide the user with a message in the event that charging is interrupted (e.g., power outage, user starts vehicle before charging schedule is complete, vehicle is unplugged, etc.). These are some examples as others are also possible.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for charging a plug-in electric vehicle with an external power source, comprising the steps of:
   a) receiving a utility rate preference from a vehicle user, the utility rate preference establishes a maximum utility rate that the vehicle user is willing to pay;
   b) determining utility rates;
   c) determining a total charging time needed to charge the plug-in electric vehicle;
   d) using the utility rates and the total charging time to develop one or more charging options and presenting the charging options to the user for selection, wherein at least one of the charging options includes a plurality of discontinuous charging segments that together fully charge the plug-in electric vehicle and at least one of the charging options is presented to the user with an estimated cost; and
   e) charging the plug-in electric vehicle with the external power source according to the charging option selected by the user.

2. The method of claim 1, further comprising the step of:
   determining when it is time to start charging the plug-in electric vehicle, wherein a current time is compared to a charging start time before step (e).

3. The method of claim 2, wherein the current time is determined using at least one of the following time readings: cellular time, GPS time, or internal clock time.

4. The method of claim 3, wherein when cellular time is available then the current time is determined using cellular time, when cellular time is not available but GPS time is available then the current time is determined using GPS time and a stored offset value, and when cellular time and GPS time are not available but internal clock time is available then the current time is determined using internal clock time.

5. A method for charging a plug-in electric vehicle with an external power source, comprising the steps of:
   (a) receiving a utility rate preference from a vehicle user, the utility rate preference establishes a maximum utility rate that the vehicle user is willing to pay;
   (b) determining utility rates;
   (c) determining a total charging time needed to charge the plug-in electric vehicle, the total charging time is based on current charging conditions pertaining to the external power source, to the plug-in electric vehicle, or to both the external power source and the plug-in electric vehicle;
   (d) developing a charging strategy that takes into account the utility rate preference, the utility rates, and the total charging time needed to charge the plug-in electric vehicle; and
   (e) charging the plug-in electric vehicle with the external power source according to the charging strategy, wherein the charging strategy implements a charging process that includes a plurality of discontinuous charging segments that together form a single charge cycle based on the total charging time for charging the vehicle before the vehicle user wishes to use the vehicle next, each of the discontinuous charging segments charges the vehicle when the current utility rates are less than or equal to the maximum utility rate that the vehicle user is willing to pay, and each of the discontinuous charging segments is separated from another discontinuous charging segment by a break during which the current utility rates are more than the maximum utility rate that the vehicle user is willing to pay.

6. The method of claim 1, wherein step (a) further comprises receiving the utility rate preference from a user via an in-vehicle user interface.

7. The method of claim 1, wherein step (a) further comprises receiving the utility rate preference from a user via a wireless communication through a communications module.

8. The method of claim 1, wherein step (b) further comprises determining utility rates by wirelessly receiving utility rate information from a utility company.

\* \* \* \* \*